US007653402B2

(12) United States Patent
Bocking et al.

(10) Patent No.: US 7,653,402 B2
(45) Date of Patent: Jan. 26, 2010

(54) COORDINATED CHANGING OF EMAIL SETTINGS ON WIRELESS ELECTRONIC DEVICES AND WIRELESS NETWORKS

(75) Inventors: Andrew D. Bocking, Waterloo (CA); Anthony G. Burns, Waterloo (CA); David P. Yach, Waterloo (CA); Phil H. Nguyen, Kitchener (CA); Piotr K. Tysowski, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 291 days.

(21) Appl. No.: 11/734,868

(22) Filed: Apr. 13, 2007

(65) Prior Publication Data

US 2007/0185962 A1    Aug. 9, 2007

Related U.S. Application Data

(63) Continuation of application No. 10/988,305, filed on Nov. 12, 2004, now Pat. No. 7,218,926.

(51) Int. Cl.
*H04W 4/00* (2009.01)
(52) U.S. Cl. .................. 455/466; 455/417; 455/418; 455/419; 455/410; 455/411
(58) Field of Classification Search .......... 455/417, 455/418, 419, 420, 410, 411, 466
See application file for complete search history.

(56) References Cited

U.S. PATENT DOCUMENTS 6,452,588 B2    9/2002  Griffin et al.

| 6,489,950 | B1 | 12/2002 | Griffin et al. |
|---|---|---|---|
| 7,010,303 | B2 | 3/2006 | Lewis et al. |
| 7,437,416 | B2 * | 10/2008 | Enatsu et al. ............... 709/206 |
| 2002/0037714 | A1 | 3/2002 | Takae et al. |
| 2002/0049806 | A1 * | 4/2002 | Gatz et al. .................. 709/203 |
| 2003/0023671 | A1 | 1/2003 | Abdulrahiman et al. |
| 2003/0228011 | A1 | 12/2003 | Gibson |
| 2004/0052347 | A1 | 3/2004 | Kimura et al. |
| 2004/0087337 | A1 | 5/2004 | Takae et al. |
| 2004/0117451 | A1 | 6/2004 | Chung |
| 2004/0266408 | A1 | 12/2004 | Maes |

(Continued)

OTHER PUBLICATIONS

Gibbons, A. et al., "How to Use Outlook Out of Office Assistant", http://web.archive.org/web/20040218234413/http://ittraining.1se.ac.uk/documentation/Files/Outlook-Out-of-Office-Assistant.pdf, Dec. 2002, 4 pp.
Dunlap, T., "OQO device, subnotebooks hit CES", http://www.cnet.com/4520-7912_1-5116369-1.html, Jan. 8, 2004, 3 pp.

(Continued)

*Primary Examiner*—Joseph H Feild
*Assistant Examiner*—Huy D Nguyen
(74) *Attorney, Agent, or Firm*—Kirk D. Houser, Esq.; Brij K. Agarwal, Esq.; Eckert Seamans Cherin & Mellott, LLC (57) ABSTRACT

A method and apparatus for changing settable email parameters in a system supporting email using a wireless device, the system including a wireless electronic device and a wireless network. Provided is a way of changing email settings on the wireless device, and storing those changes on both the device and, as needed or desired, on the wireless network. The wireless network and wireless device are adapted to wirelessly communicate with each other.

27 Claims, 7 Drawing Sheets

U.S. PATENT DOCUMENTS

2005/0097170 A1    5/2005    Zhu et al.
2005/0193144 A1    9/2005    Hassan et al.
2006/0009235 A1*  1/2006    Sheynblat et al. ........ 455/456.1

OTHER PUBLICATIONS

De Herrera, C., "Windows Mobile 2003 Screen Shots", http://www.archive.org/web/20031009121607/http://www.cewindows.net/wce/42/windowsmobile2003inboxscreens.htm, Jul. 28, 2003, 8 pp.

Research in Motion Limited, "BlackBerry Enterprise Server for Exchange Overview", http://web.archive.org/web/20041026192830/http://www.blackberry.net/products/software/server/exchange/overview.shtml, 2004, 5 pp.

Research in Motion Limited, "BlackBerry Enterprise Server for Microsoft Exhange", Version 4.0, Feature and Technical Overview, 2004, 51 pp.

Flaherty, C. et al., "BlackBerry Enterprise Server v4.0 Release Candidate Now Available", XP-002497517, Business Wire, Sep. 27, 2004, 6 pp.

Research in Motion Limited, "BlackBerry Enterprise Server version 3.6 for Microsoft Exchange", XP-002497503, 2003, 18 pp.

Research in Motion Limited, "BlackBerry® Enterprise Server for Microsoft® Exchange Feature Comparison", XP002497521, http://www.sfrentreprises.fr/elements/documents/espace-client/utilisateurs/business-mail/logiciel/MS_feature_comparison.pdf, 2004, 1 P.

* cited by examiner

Folder Redirection:
- ⊖ Desktop
  - ⊖ ☐ Mailbox — John Public
    - ☐ Build failed
    - ☐ Deleted Items
    - ☐ Gate Keeper Hell
    - ☑ Inbox ⌒ 226
    - ☐ Java Dev
    - ☐ Java Device Apps
    - ☑ User-Defined Email Folder ⌒ 228
    - ☐ Public Relation Clips

FIG.10    224

| Email Settings | |
|---|---|
| 198 — Send Email to Handheld: | Yes |
| 200 — Save Copy in Sent Folder: | Yes |
| 202 — Use Auto Signature: | Yes |
| 205 — ▶ My Signature | |
| Out of office reply ⌒ 204 | Yes |
| Due date: | Fri. Dec 10, 2004 |
| ▶ Note-I will be out of the office..... | |

COORDINATED CHANGING OF EMAIL SETTINGS ON WIRELESS ELECTRONIC DEVICES AND WIRELESS NETWORKS

This application is a continuation of application Ser. No. 10/988,305, filed Nov. 12, 2004 now U.S. Pat. No. 7,218,926, and entitled "Method, Wireless Handheld Electronic Device And System Of Remotely Controlling E-Mail Settings From The Device".

BACKGROUND OF THE INVENTION

1. Field of the Invention

The invention relates generally to handheld electronic devices and, more particularly, to a handheld electronic device including an e-mail function. The invention also relates to a method or a system of remotely controlling e-mail settings from such a handheld electronic device.

2. Background Information

Numerous types of handheld electronic devices are known. Examples of such handheld electronic devices include, for instance, personal digital assistants (PDAs), handheld computers, two-way pagers, cellular telephones, and the like. Many handheld electronic devices also feature wireless communication capability, although many such handheld electronic devices are stand-alone devices that are functional without communication with other devices.

Electronic mail (email or e-mail) is used to send messages over networks and over the Internet. Electronic messaging has become a ubiquitous means of communication for both business and personal use. Devices that process electronic messages typically maintain a message list identifying electronic messages received for reading and processing by the recipient. Such processing can include, for example, replying to, forwarding to others, deleting and filing the messages.

It is known to configure e-mail settings for wireless handheld electronic devices from a software utility at a desktop personal computer that interfaces with a wireless enterprise server over, for example, the Internet. Such e-mail settings may include, for example, e-mail filter settings, e-mail redirection settings, save copy of e-mail in a sent folder settings, e-mail auto-signature settings, and out-of-office reply e-mail settings. For example, an e-mail filter setting is a setting that blocks certain e-mail messages based upon user-selected criteria. An e-mail redirection setting enables and disables the redirection of e-mail messages from a user's normal e-mail system to the user's wireless handheld electronic device. Such settings may also redirect e-mail messages from selected folders (e.g., Inbox; Spam) in the user's normal e-mail system. An e-mail auto-signature setting enables and disables appending predefined text to an e-mail message that is sent from a wireless handheld electronic device. An out-of-office reply e-mail setting enables or disables sending a predefined reply e-mail message from a wireless handheld electronic device in response to an e-mail message that is received by such device. For example, the out-of-office reply e-mail setting is configurable via a program, such as, for example, Microsoft® Outlook® or Lotus Notes® on a personal computer. The other e-mail settings (e.g., auto-signature; redirected folders; e-mail redirection) are controlled via desktop software on a personal computer.

There exists the need for users of wireless handheld electronic devices to remotely control their e-mail settings from such devices without having to use a software utility at, for example, a desktop personal computer. Accordingly, there is room for improvement in wireless handheld electronic devices and related systems and methods.

SUMMARY OF THE INVENTION

These needs and others are met by the invention, which provides a user interface on a wireless handheld electronic device, in order to remotely control e-mail settings for the device without using a software utility at, for example, a desktop personal computer.

In accordance with one aspect of the invention, a method of changing e-mail settings on a wireless handheld device comprises: detecting an email setting displayable on the wireless handheld device; saving the detected email setting in the wireless handheld device, such that the detected email setting is retrievable at a later time; sending, using a wireless output communications port of the wireless handheld device, the detected email setting in a manner receivable by a wireless server and uniquely associable with the sending wireless handheld device; and using, as needed by a message application of the wireless handheld device, the detected email setting.

As another aspect of the invention, a mobile wireless handheld device comprises: wireless input and output ports; a memory; a display; at least one input device configured to be usable by a user of the wireless handheld device; software comprising at least a message application, retrievably stored in the memory; and a processor operatively coupled to the wireless input and output ports, the memory, the display, the at least one input device, and structured to retrieve and run the software, where the software is further configured to run on the processor, and further where the software and the processor are configured to be able to retrieve and save a plurality of email settings, the email settings further saved in a manner usable by the message application, to enable display of changeable email settings and detection of changes to the email settings by the at least one input device, to save detected changes to email settings in a manner usable by the software, and to send, through the output port, wireless communications configured to be receivable by a wireless server where the detected changes to the email settings are uniquely associable with the wireless handheld device.

As another aspect of the invention, a method of changing e-mail settings on a wireless network comprises: providing storage for email settings on the wireless network, the storage enabled for retrievably storing email settings associated with a specific wireless device; receiving, on the wireless network, a communication comprised of at least one email setting associable with the specific wireless device, where the received at least one email setting has the property of being changeable by an input device on the specific wireless device; saving, in the storage, the received at least one email setting in a manner associated with the specific wireless device; and retrieving, at a time later than the saving, the saved at least one email setting and enabling for retrieval any other information in the storage associated with the specific wireless device.

As another aspect of the invention, a method of remotely controlling e-mail settings comprises: maintaining at least one of the e-mail settings at a wireless enterprise server; associating at least one of the e-mail settings with the wireless handheld electronic device; and enabling remote control of at least one of the e-mail settings at the wireless enterprise server through wireless communication between the wireless enterprise server and the wireless handheld electronic device.

The e-mail setting may be an e-mail filter setting, and the wireless handheld electronic device may be employed to create, display, edit or delete the e-mail filter setting.

The e-mail setting may be an e-mail redirection setting, and the wireless handheld electronic device may be employed to enable or disable the e-mail redirection setting. At least one folder corresponding to a predetermined category of e-mail messages may be included with the e-mail redirection setting. The wireless handheld electronic device may be employed to select at least one of the at least one folder.

At least one folder for at least one e-mail message may be associated with the e-mail redirection setting. An e-mail message for one of the at least one folder may be forwarded or redirected to the wireless handheld electronic device. The wireless handheld electronic device may be employed to enable or disable the forwarding or redirecting for the one of the at least one folder.

The e-mail setting may be an out-of-office reply e-mail setting, and the wireless handheld electronic device may be employed to create, enable, edit or disable the out-of-office reply e-mail setting. The out-of-office reply e-mail setting may be automatically disabled at a predetermined date. The wireless handheld electronic device may be employed to edit the predetermined date.

The e-mail setting may be associated with saving a copy of a sent e-mail in a sent folder. The wireless handheld electronic device may be employed to enable or disable the e-mail setting associated with saving a copy of a sent e-mail in a sent folder.

The e-mail setting may be an auto signature e-mail setting. The wireless handheld electronic device may be employed to enable or disable the auto signature e-mail setting. A text field may be associated with the auto signature e-mail setting, and the wireless handheld electronic device may be employed to edit the text field.

As another aspect of the invention, a system comprises: a wireless handheld electronic device comprising a plurality of e-mail settings associated therewith; and at least one server comprising a database maintaining at least one of the e-mail settings, at least one of the at least one server being adapted to wirelessly communicate with the wireless handheld electronic device. The wireless handheld electronic device is adapted to remotely control at least one of the e-mail settings at the at least one server through wireless communication between the at least one server and the wireless handheld electronic device.

The at least one server may comprise a wireless enterprise server and an e-mail server. The at least one of the e-mail settings may comprise an out-of-office reply e-mail setting. The wireless handheld electronic device may be further adapted to input a change to the out-of-office reply e-mail setting and to wirelessly send the change to the wireless enterprise server. The wireless enterprise server may be adapted to forward the change to the e-mail server.

The e-mail server may be adapted to independently update a change to the out-of-office reply e-mail setting from a remote personal computer or from a remote client device including mail client software. The wireless enterprise server may be further adapted to periodically monitor the out-of-office reply e-mail setting of the e-mail server and to wirelessly send a change thereof to the wireless handheld electronic device.

The at least one server may comprise a wireless enterprise server. The wireless handheld electronic device may be further adapted to input a plurality of changes to the e-mail settings and to wirelessly send the changes to the wireless enterprise server. The wireless enterprise server may be adapted to update the at least one of the e-mail settings in the database based upon the changes.

The at least one server may further comprise an e-mail server. The at least one of the e-mail settings may comprise an out-of-office reply e-mail setting. The wireless handheld electronic device may be further adapted to input a change to the out-of-office reply e-mail setting and to wirelessly send the change to the wireless enterprise server. The wireless enterprise server may be adapted to forward the change to the e-mail server.

As another aspect of the invention, a wireless handheld electronic device comprises: an input apparatus; a wireless communication port; a memory including a plurality of e-mail settings associated with the wireless communication port; and a processor cooperating with the input apparatus, the wireless communication port and the memory to remotely control at least one of the e-mail settings at a wireless server through wireless communication with the wireless communication port.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the terms "e-mail setting" or "e-mail settings" mean one, some or all of e-mail filter setting(s), e-mail redirection setting(s), e-mail setting(s) associated with saving a copy of a sent e-mail in a sent folder, auto-signature e-mail setting(s), and out-of-office reply e-mail setting(s).

The invention is described in association with a wireless handheld electronic device, although the invention is applicable to a wide range of handheld electronic devices.

Figure 1:
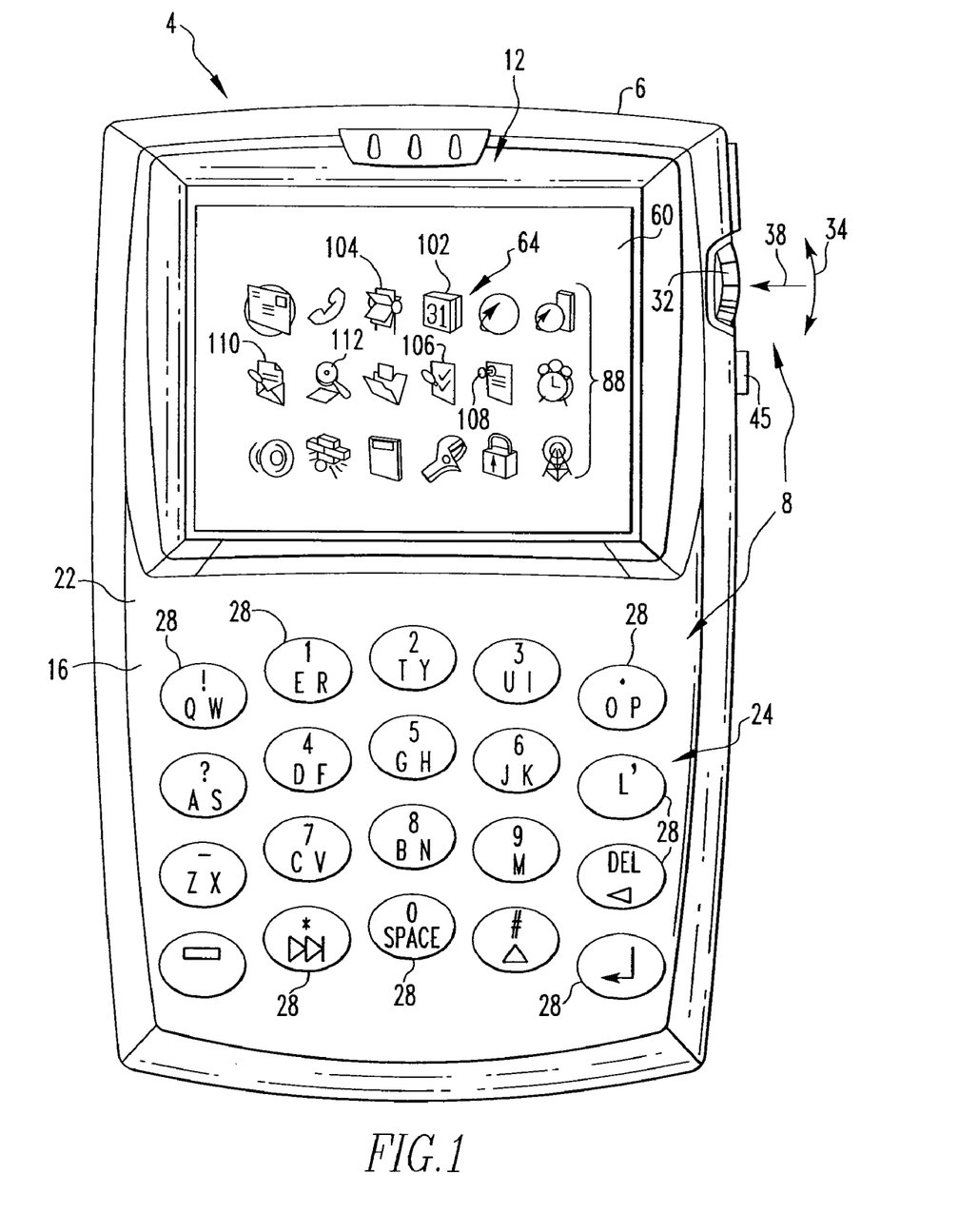
FIG. 1 is a top plan view of a wireless handheld electronic device in accordance with the invention.
Figure 2:
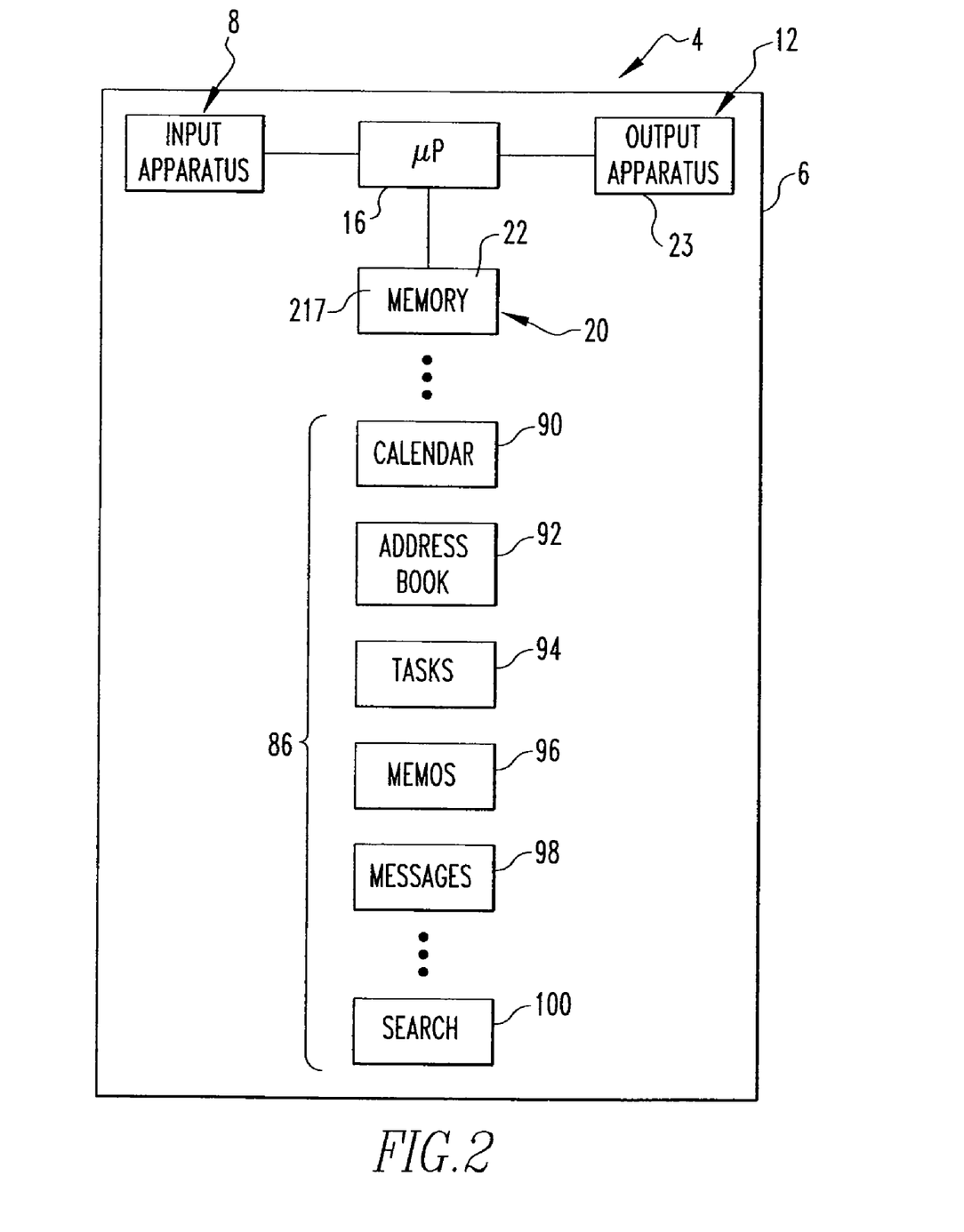
FIG. 2 is a schematic depiction of the wireless handheld electronic device of FIG. 1.

A wireless handheld electronic device 4 is indicated generally in FIG. 1 and is depicted schematically in FIG. 2. The example device 4 includes a housing 6 upon which are disposed a processor unit that includes an input apparatus 8, an output apparatus 12, a processor 16 (as shown in FIG. 2), a memory 20 (FIG. 2), and a plurality of routines 22 (FIG. 2). The processor 16 may be, for instance, and without limitation, a microprocessor (µP) that responds to inputs from the input apparatus 8 and provides output signals to the output apparatus 12, which includes a wireless communications port 23 (FIG. 2). The processor 16 also interfaces with the memory 20. Examples of handheld electronic devices are included in U.S. Pat. Nos. 6,452,588 and 6,489,950, which are incorporated by reference herein.

As can be understood from FIG. 1, the input apparatus 8 includes a keypad 24 and a thumbwheel 32. The wireless handheld electronic device 4, as shown, employs a user interface including, for example, the keypad 24 and the thumbwheel 32 for user interface navigation. As an alternative to the thumbwheel 32, a wide range of cursor positioning and/or function selecting mechanisms or other suitable user input devices (e.g., a touch pad; a joystick button), whether presently known or unknown, may be employed.

Continuing to refer to FIG. 1, the keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Another key, the <ESC> key 45 is disposed on the side of the housing 6 adjacent the thumbwheel 32, although the same or similar key may be disposed as part of the keypad 24.

The memory 20 (FIG. 2) can be any of a variety of types of internal and/or external storage media such as, without limitation, RAM, ROM, EPROM(s), EEPROM(s) and/or the like that provide a storage register for data storage such as in the fashion of an internal storage area of a computer, and can be volatile memory or nonvolatile memory. The memory 20 additionally includes the routines 22 for the processing of data. The routines 22 can be in any of a variety of forms such as, without limitation, software, firmware, and the like.

Referring again to FIG. 1, the output apparatus 12 includes a display 60 upon which is provided an example output 64. The display 60 may also include a caret (e.g., cursor) 84 (FIG. 7) that depicts generally where the next input from the input apparatus 8 will be received. The output 64 of FIG. 1 is depicted as displaying a home screen that represents a number of applications 86 (FIG. 2) depicted as corresponding discrete icons 88. The applications 86 include, for example, a Calendar application 90, an Address Book application 92, a Tasks application 94, a MemoPad (Memos) application 96, a Messages application 98 and a Search application 100. The corresponding icons 88 include, for example, the Calendar icon 102, the Address Book icon 104, the Tasks icon 106, the MemoPad icon 108, the Messages icon 110 and the Search icon 112, respectively. Although various applications and icons are shown, a wide range of fewer or greater applications and icons may be employed.

In FIG. 1, the home screen output 64 is currently active and would constitute another one of the applications 86. One of the other applications 86, such as the Messages application 98, can be initiated from the home screen output 64 by providing a suitable input through the input apparatus 16, such as by suitably rotating the thumbwheel 32 and providing a selection input by translating the thumbwheel 32 in the direction indicated by the arrow 38. For example, the home screen output 64 displays the icon 110 associated with the Messages application 98.

Figure 3:
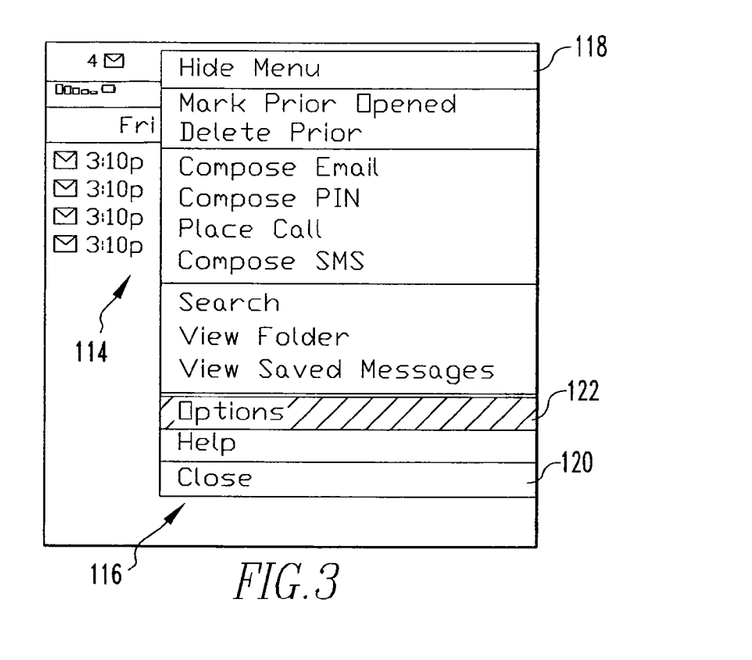
FIG. 3 is an example of a Message List and a corresponding menu screen of the display of FIG. 1.
Figure 4:
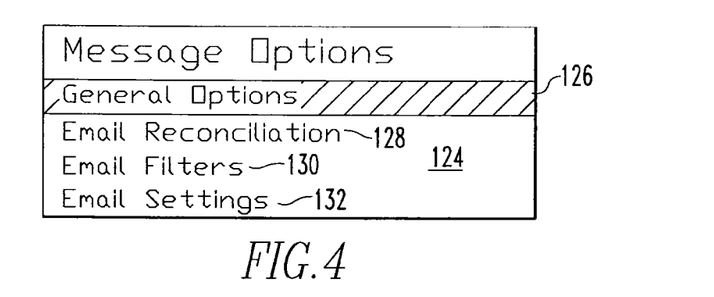
FIG. 4 is an example of a Message Options menu screen that is displayed after making a selection from the menu screen of FIG. 3.

FIG. 3 is an example of a message list 114 and a corresponding menu screen 116 of the display 60 of FIG. 1. The message list 114 is displayed by the processor 16 responsive to the initiation of the Messages application 98 (FIG. 2), as was discussed above. The menu screen 116 is displayed by the processor 16 from the Messages application 98 responsive to the processor detecting another input through the input apparatus 16, such as by providing a selection input by translating the thumbwheel 32 in the direction indicated by the arrow 38 (FIG. 1). Within the menu screen 116, there are menu items including, for example, a Hide Menu item 118, which when selected causes the menu screen 116 to be removed from the display 60, a Close item 120, which when selected causes the Messages application 98 to close and the home screen output 64 (FIG. 1) to be redisplayed, and an Options item 122. When the Options item 122 is selected, in the same manner that has been described, the Message Options menu screen 124 of FIG. 4 is displayed.

The menu screen 124 includes a General Options item 126, an Email Reconciliation item 128, an Email Filters item 130, and an Email Settings item 132. The General Options item 126, when selected, permits the user to set conventional e-mail client settings (e.g., Display Time; Display Name; Confirm Delete) on the handheld electronic device 4. The Email Reconciliation item 128, when selected, provides a conventional bi-directional e-mail reconciliation between the user's main e-mail processor (e.g., a personal computer (PC) 134 (FIG. 12), desktop or workstation) and the handheld electronic device 4. Although the items 126 and 128 are shown, one or both of these items need not be employed. Selecting the Email Filters item 130 causes the Email Filters display 136 of FIG. 5 to be displayed. Similarly, selecting the Email Settings item 132 causes the Email Settings display 138 of FIG. 8 to be displayed.

Figure 10:
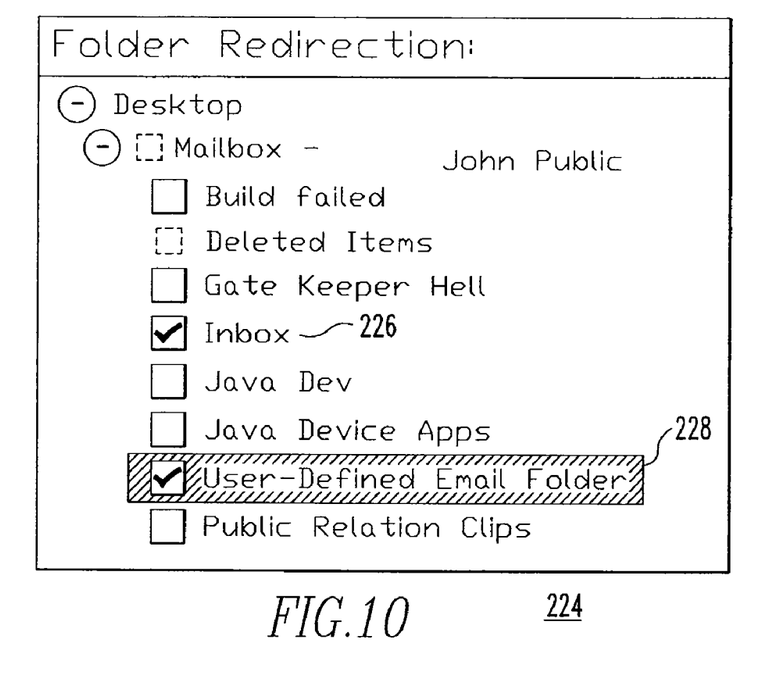
FIG. 10 is an example of a Folder Redirection display screen that is displayed after making a selection from the menu screen of FIG. 9.
Figure 11:
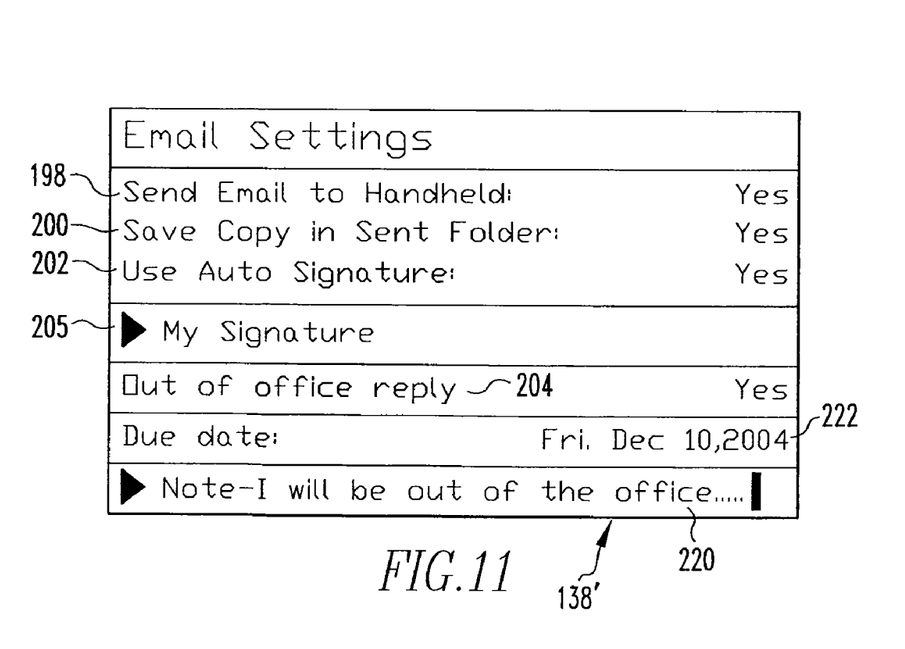
FIG. 11 is an example of the Email Settings display screen that is displayed after making a selection from the corresponding menu screen of FIG. 9.

As will be explained, starting from the Message Options menu screen 124, the user may control various different e-mail settings such as, for example, e-mail filter settings (FIGS. 5-7), auto signature e-mail settings (FIG. 8), e-mail folder redirection settings (FIG. 10) and out-of-office reply e-mail settings (FIG. 11). As will be discussed, below, in connection with FIG. 12, the e-mail settings 248, which are created, displayed, edited and/or deleted by the wireless handheld electronic device 4, permit the software utility 140 of the PC 134 (FIG. 12) to not be required for day-to-day usage. As a result, users can configure important e-mail settings from the wireless handheld electronic device 4. Those e-mail settings 248 may also be found, for example, in a Redirector Settings component 142 of the PC software utility 140.

Figure 5:
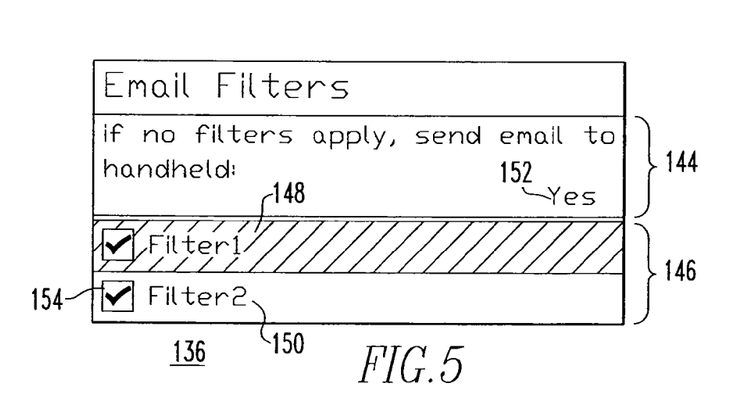
FIG. 5 an example of an Email Filters display screen that is displayed after making a selection from the menu screen of FIG. 4.
Figure 6:
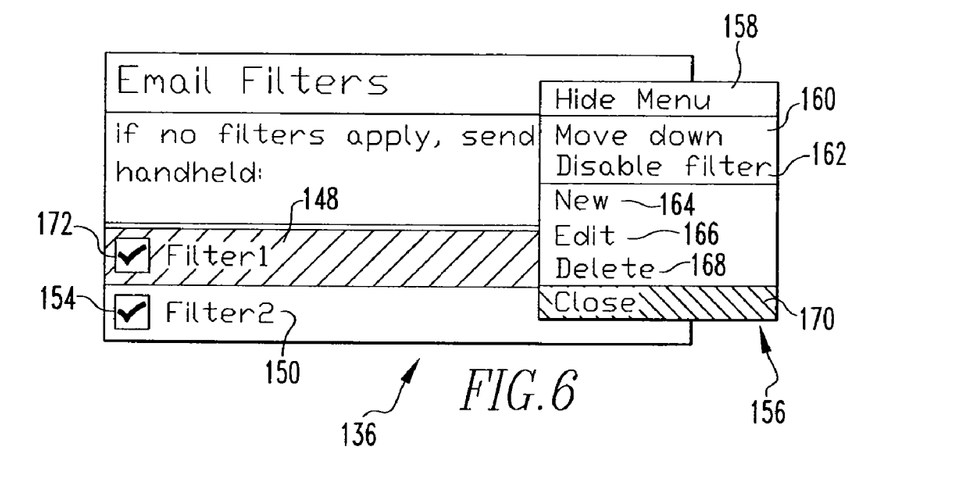
FIG. 6 an example of the Email Filters display screen of FIG. 5 and the corresponding menu screen.
Figure 7:
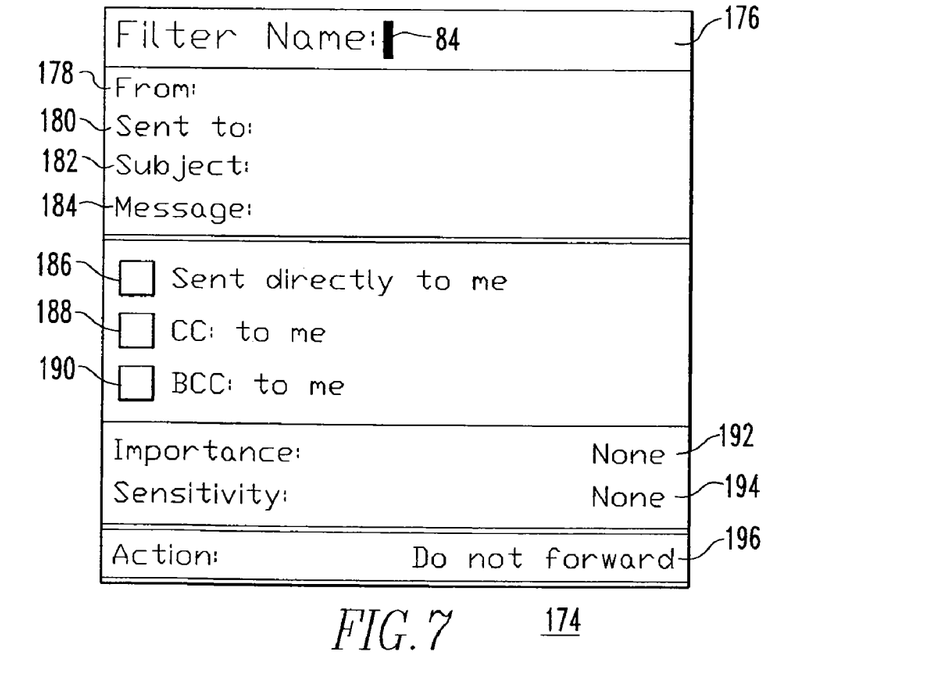
FIG. 7 an example of a Filter display screen that is displayed after making a selection from the menu screen of FIG. 6.

Referring to FIGS. 5-7, the user can create (FIGS. 6 and 7), display (FIGS. 5-7), edit (FIGS. 6 and 7) and delete (FIG. 6) various e-mail filters. As shown in the Email Filters display 136 of FIG. 5, there is a first display portion 144 and a second display portion 146 including two example filters 148 (Filter1) and 150 (Filter2). The first display portion 144 shows that if no filters apply, then an e-mail message will be sent to the wireless handheld electronic device 4 as indicated by the redirection setting 152 (Yes). If, however, the setting 152 was "No," then e-mail messages that do not meet the various filter criteria are not forwarded or redirected to the wireless handheld electronic device 4. In this example, there are two enabled (e.g., as indicated by the example checks, such as 154) filters 148,150, although there may be one or more filters each of which may be independently enabled or disabled (e.g., the absence of a check (not shown)).

As shown in FIG. 6, a menu screen 156 can be initiated from the display 136 by providing a suitable input through the input apparatus 16, such as by suitably rotating the thumbwheel 32 (FIG. 1) (e.g., to select Filter1 148, as shown) and providing a selection input by translating the thumbwheel 32 in the direction indicated by the arrow 38. The menu screen 156 for the enabled Filter1 148 includes a Hide Menu item 158, a Move down item 160, a Disable filter item 162, a New item 164, an Edit item 166, a Delete item 168 and a Close 170 to exit from the Email Filters display 136. Selecting one of those items (even numbers 158-170) provides one of the following seven actions: (1) the Hide Menu item 158 removes the menu screen 156 from the display 60 (FIG. 1); (2) the Move down item 160 causes the selected e-mail filter to be moved down in priority below the next e-mail filter (e.g., Filter2 150 would be executed prior to Filter1 148, in order to attempt to filter out forwarding of an e-mail message to the device 4); (3) the Disable filter item 162 disables the selected e-mail filter (e.g., causing the check 172 to be removed (not shown)); (4) the New item 164 displays the Filter display screen 174 of FIG. 7 and allows the user to create a new email filter; (5) the Edit item 166 displays a display screen (not shown) for the selected e-mail filter that is similar to the screen 174 except that it includes information previously entered for that selected e-mail filter; (6) the Delete item 168 causes the selected e-mail filter to be deleted and removed from the screen 136; and (7) the Close item 170 removes the display 136 and redisplays the menu screen 124 (FIG. 4). If the selected e-mail filter is disabled (not shown), then the Disable filter item 162 is displayed as "Enable filter". If the selected e-mail filter is at the bottom of the screen 136 (e.g., such as Filter2 150), then the Move down item 160 is displayed as "Move up".

As shown in the Filter display screen 174 of FIG. 7, each of the e-mail filters includes a number of entry fields, such as 176,178,180,182,184, that define the new or previously created e-mail filter. For example, the field 176 defines the e-mail filter name (e.g., Filter1; Filter2, as shown in FIG. 6). Zero, one, some or all of the fields 178,180,182,184 may be employed to filter an e-mail message based upon the sender as selected by field 178, the recipient as selected by field 180, the message subject as selected by field 182, and the message contents as selected by field 184. Furthermore, zero, one, some or all of the check boxes 186,188,190 may be employed to filter an e-mail message that is sent directly to the user as selected by check box 186, that is ("carbon") copied ("CC") to the user as selected by check box 188 and/or that is ("blind carbon") copied ("BCC") to the user as selected by check box 190. Also, one or both of the fields 192,194 may be employed to filter an e-mail message that includes an importance setting (e.g., high; normal; low; none) as selected by field 192 or a sensitivity setting (e.g., personal; confidential; private; normal; ThankYou!; none) as selected by field 194. Further, there is a field 196 that defines the action taken (e.g., do not forward) if the test of the corresponding e-mail filter is true.

EXAMPLE 1

For example, Filter1 148 would include "Filter1" in field 176 (FIG. 7) and may include "JohnSmith@xyz.com" in the from field 178 and the check box 186 being checked. As a result, e-mail messages from JohnSmith@xyz.com sent directly to the user of the device 4 would not be forwarded to the user's wireless handheld.

EXAMPLE 2

For example, Filter2 150 would include "Filter2" in field 176 (FIG. 7) and may include "Low Rate Mortgage" in the subject field 182. As a result, any e-mail messages including that text in the subject field would not be forwarded.

FIGS. 5-7 show that users can now perform any or all of the following actions directly from the device 4 without requiring any PC 134 (FIG. 12): (1) view e-mail filters (FIGS. 5-7); (2) edit e-mail filters (FIGS. 6 and 7); (3) delete e-mail filters (FIG. 6); and (4) create new e-mail filters (FIGS. 6 and 7).

Figure 8:
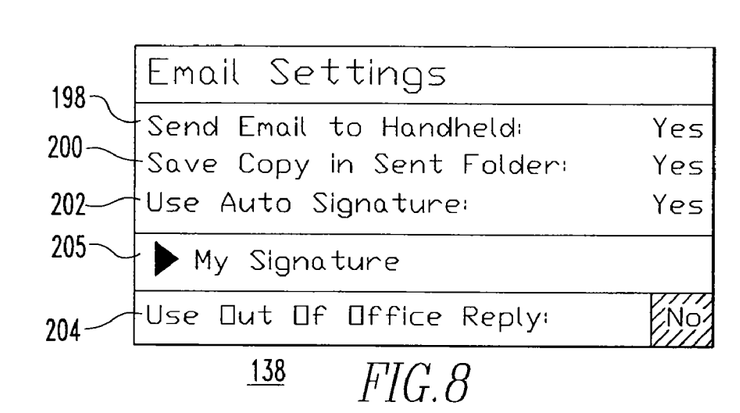
FIG. 8 is an example of an Email Settings display screen that is displayed after making a selection from the menu screen of FIG. 4.

The Email Settings display 138 of FIG. 8 is displayed after selecting the corresponding item 132 from the menu screen 124 of FIG. 4. The display 138 includes various e-mail settings, such as, for example, an e-mail redirection setting 198 (e.g., Send Email To Handheld), an e-mail setting 200 associated with saving a copy of a sent e-mail in a sent folder (e.g., Save Copy In Sent Folder), an auto signature e-mail setting 202 (e.g., Use Auto Signature), and an out-of-office reply e-mail setting 204 (e.g., Use Out Of Office Reply). Those e-mail settings 198,200,202,204 may individually be enabled (e.g., Yes) or disabled (e.g., No). Although example e-mail setting selections are shown, none, one, some or all may be enabled and none, one, some or all may be disabled. Since the auto signature e-mail setting 202 is enabled, also displayed is the corresponding auto signature text 205 (e.g., in this example, My Signature).

Figure 9:
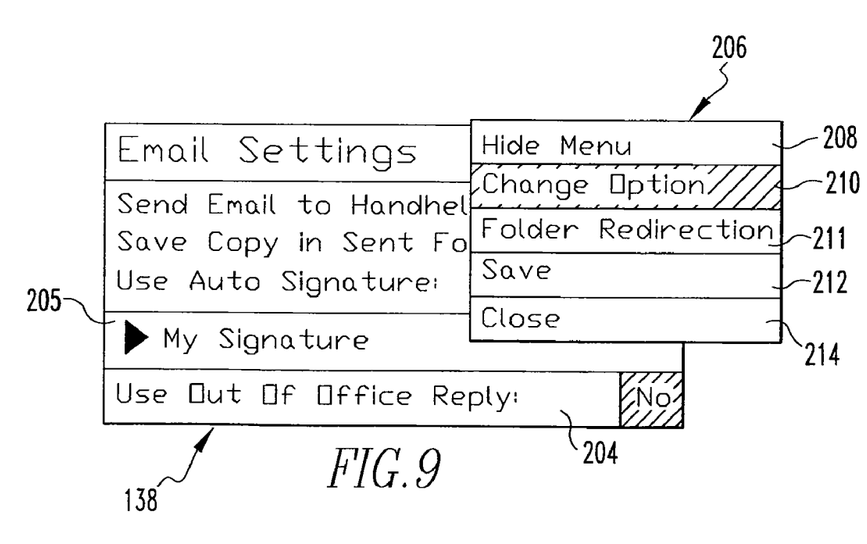
FIG. 9 an example of the Email Settings display screen of FIG. 8 and the corresponding menu screen.

FIG. 9 shows the display screen 138 of FIG. 8 and the corresponding menu screen 206 that is displayed by the processor 16 (FIG. 2) responsive to the processor detecting another input through the input apparatus 16, such as by providing a selection input by translating the thumbwheel 32 in the direction indicated by the arrow 38 (FIG. 1). The menu screen 206 includes menu items 208,210,211,212,214. Selecting one of those menu items 208,210,211,212,214 provides one of the following five actions: (1) the Hide Menu item 208 removes the menu screen 206 from the display 60 (FIG. 1); (2) the Change Option item 210 either toggles the selected one of the e-mail settings 198,200,202,204 (e.g., selected e-mail setting 204, in this example, would toggle from No to Yes); (3) the Folder Redirection item 211 brings up the display screen 224 shown in FIG. 10; (4) the Save item 212 saves the current e-mail settings 198,200,202,204 in the memory 20 (FIG. 2) of the device 4 and, also, remotely controls the corresponding e-mail settings in the wireless enterprise server 216 and/or mail server 218 (FIG. 12); and (5) the Close item 214 removes the display screen 138 and redisplays the menu screen 124 (FIG. 4).

EXAMPLE 3

For example, if the user edits one, some or all or the e-mail settings 198,200,202,204 and/or the text fields 205 or 220 (FIG. 11) and then selects the Save item 212, that information is saved in the memory 20 (FIG. 2) and, also, is wirelessly communicated by the device 4 to the wireless enterprise server 216 as will be discussed, below, in connection with FIG. 12.

Figure 12:
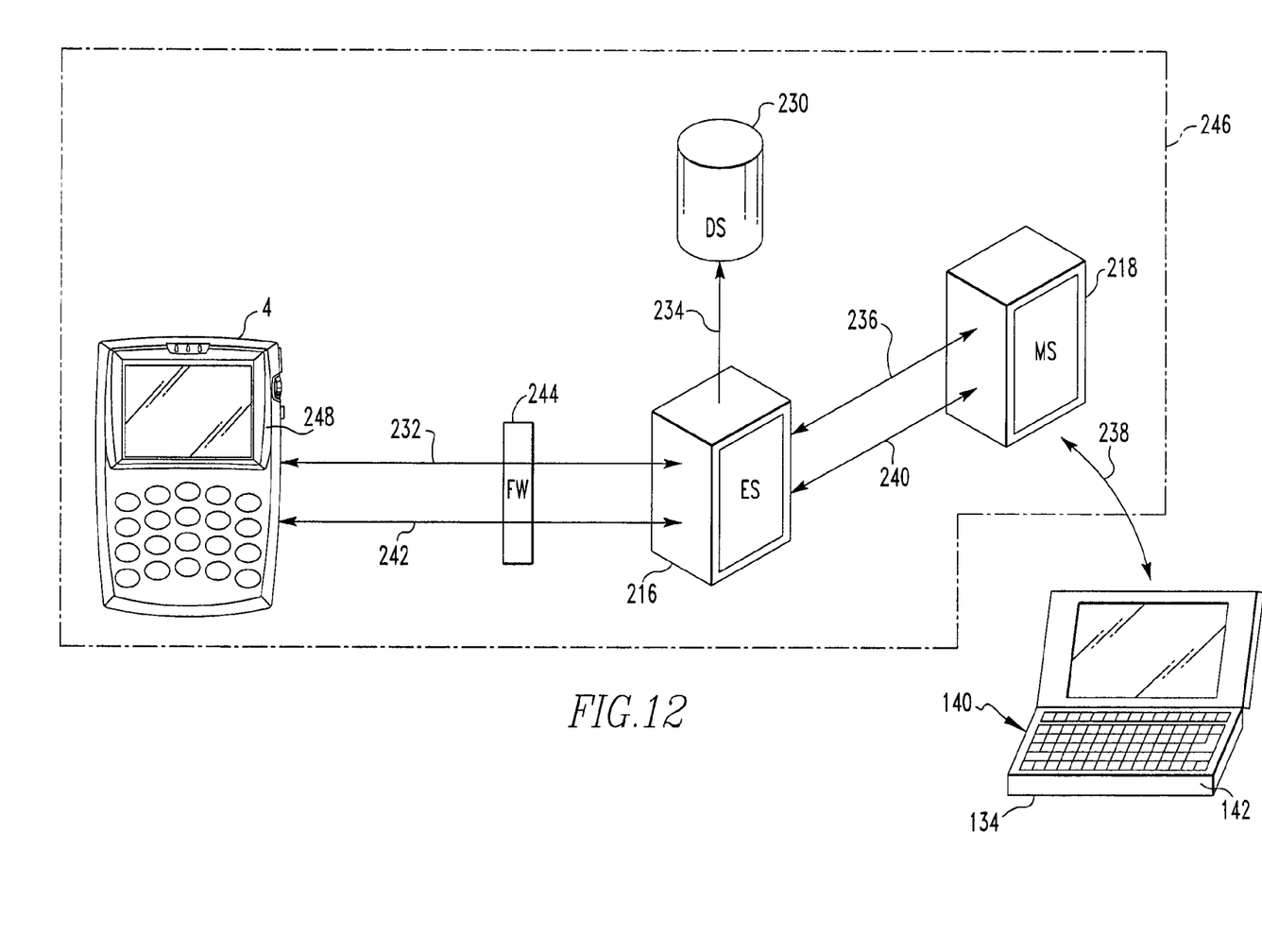
FIG. 12 is a block diagram showing a wireless handheld electronic device, a wireless enterprise server and database store, a mail server and a personal computer (PC) in accordance with an embodiment of the invention.

If the e-mail setting Send Email To Handheld 198 is enabled (Yes), then if none of the rules of the e-mail filters (e.g., FIG. 5) apply, then the e-mail message is forwarded or redirected to the device 4 by the wireless enterprise server 216 (FIG. 12). FIGS. 8 and 9 show that the user can view and change the e-mail redirection setting 198 by selecting the particular e-mail setting with the thumbwheel 32, displaying the menu 206, and selecting the Change Option item 210.

If the e-mail setting Save Copy In Sent Folder 200 is enabled (Yes), then the processor 16 (FIG. 2) saves a copy of the e-mail message in a sent folder 217 (FIG. 2) in the memory 20 of the device 4. FIGS. 8 and 9 show that the user can view and change the e-mail setting 200.

If the e-mail setting Use Auto Signature 202 is enabled (Yes), then the text 205 is appended by the e-mail server 218 (FIG. 12) to any e-mail messages that are sent by the device 4. FIGS. 8 and 9 show that the user can view and change the e-mail setting 202 and/or create, view and edit the corresponding text field 205 operatively associated with the setting 202. For example, the text field 205 could be edited to alternatively state "Sent From My Wireless Handheld".

If the e-mail setting Use Out Of Office Reply 204 is enabled (Yes), then the mail server 218 (FIG. 12) sends a predefined reply e-mail message to any e-mail message that is sent to the user's email address/account. FIGS. 8, 9 and 11 show that the user can view and change the e-mail setting 204 and/or create, view and edit the corresponding text field 220 (e.g., "Note—I will be out of the office . . . ") (FIG. 11) or due date 222 (e.g., Fri, Dec. 10, 2004) (FIG. 11). For example, the due date 222 could be edited to alternatively state "Sat, Dec. 11, 2004").

FIG. 10 shows an example of a Folder Redirection display screen 224 that is displayed after making a selection from the menu 206 of FIG. 9. The user may employ a menu screen (not shown) similar to the menu screen 206 (FIG. 9) to edit the Folder Redirection settings wirelessly from the device 4. This allows the user to specify e-mail folders (e.g., without limitation, Inbox 226; User-defined email folder 228) for which corresponding e-mail messages are redirected or forwarded to the device 4. It will be appreciated that none, one, some or all of the various folders of the screen 224 may be selected or de-selected by the device 4.

FIG. 11 shows as screen 138' the e-mail settings display screen 138 of FIG. 8 after selecting the corresponding menu item 132 of FIG. 4 or after changing the setting 204 of FIG. 9. This shows that the user can also edit the Out of Office reply e-mail setting 204 wirelessly from the device 4. The user can enable/disable that setting 204, which is also automatically disabled if the mail server 218 (FIG. 12) (e.g., a Lotus Notes® or Domino® mail server) supports such a setting, by the device 4 and by the mail server 218 (FIG. 12) as of the specified due date 222. The user can also create and edit the auto-reply text 220. In contrast, Microsoft® Outlook® or Microsoft Exchange Server® does not automatically disable such an e-mail setting 204.

Referring to FIG. 12, the wireless handheld electronic device 4, the wireless enterprise server (ES) 216 and a database store (DS) 230 of user e-mail settings, the mail server (MS) 218 and the personal computer (PC) 134 are shown. First, the user makes one or more changes on the wireless handheld electronic device 4 to an e-mail setting (e.g., e-mail filters, such as 148,150 of FIG. 6; e-mail redirection setting 198 (FIG. 8); save copy in sent folder e-mail setting 200; use auto-signature e-mail setting 202; out-of-office reply e-mail setting 204). Responsive to the selection of the Save item 212 (FIG. 9), the one or more change(s) is (are) then sent to the wireless enterprise server (ES) 216 over a wireless connection at 232. Next, at 234, the ES 216 updates the e-mail setting(s) for this user in a suitable store, such as the user e-mail settings database store (DS) 230, which is employed by the ES 216. If the e-mail setting(s) include the out-of-office reply e-mail setting 204, then this e-mail setting is forwarded, at 236, to update the mail server 218 (e.g., Microsoft Exchange Server®) as that e-mail setting 204 is not a wireless enterprise-related setting and, instead, is a mail server setting.

In this example, the e-mail setting 204 is the only e-mail setting that affects the core mail server behavior. The other e-mail settings are enterprise e-mail settings and are stored in the mail server 218 (in the user's account) in order that the desktop software utility 140 can access them, but are only executed on by the enterprise server 216, the device 4, and (optionally) the desktop software utility 140.

Although not required, alternatively, the various e-mail setting(s) may also be updated by the user via the wireless enterprise's desktop software utility 140, if that is installed on the user's PC 134. For example, at 238, the user modifies the out-of-office reply e-mail setting 204 at the user's PC 134 and/or the wireless enterprise's desktop software utility 140 running suitable mail client software (e.g., Microsoft® Outlook®). The only e-mail setting that would be made via the email program (e.g., Microsoft® Outlook®) on the PC 134 would be the e-mail setting 204. The other of the e-mail settings 248 would all be made by the desktop software utility 140. Then, the steps work in reverse to get the updates out to the user's handheld device 4 as well. At 240, this change is noticed. For example, the ES 216 may periodically monitor and/or be notified of the e-mail settings and/or the ES 216 may subscribe to events that are published by the mail server 218. Finally, at 242, the ES 216 sends the change wirelessly to the wireless handheld electronic device 4, which responsively updates its memory 20 (FIG. 2) with the new e-mail setting(s).

For example, the mail server 218 is adapted to independently update a change to the out-of-office reply e-mail setting from a remote client device including mail client software, such as the remote PC 134. The ES 216 is adapted to periodically monitor, or be notified of changes to, the out-of-office reply e-mail setting of the mail server 218 and to wirelessly send a change thereof to the wireless handheld electronic device 4.

A suitable firewall (FW) 244 is preferably employed between the device 4 and the ES 216. Preferably, there is true "end to end" encryption between the enterprise server 216 and the device 4, such that the device 4 is truly an extension that is "behind" the virtual firewall 244.

A system 246 includes the wireless handheld electronic device 4, and one or more servers, such as the ES 216 and the MS 218. The device 4 includes a plurality of e-mail settings 248 associated therewith. The database store (DS) 230 of the ES 216 maintains one or more of those e-mail settings 248. The ES 216 is adapted to wirelessly communicate with the wireless handheld electronic device 4, which is adapted to remotely control one or more of the e-mail settings 248 at one or both of the servers 216,218 through wireless communication between the ES 216 and the device 4.

While for clarity of disclosure reference has been made herein to the exemplary display 60 for displaying information, such as e-mail setting information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of changing e-mail settings on a wireless handheld device comprising:

detecting an email setting displayable on the wireless handheld device;

saving the detected email setting in the wireless handheld device, such that the detected email setting is retrievable at a later time;

sending, using a wireless output communications port of the wireless handheld device, the detected email setting in a manner receivable by a wireless server and uniquely associable with the sending wireless handheld device; and using, as needed by a message application of the wireless handheld device, the detected email setting.

2. The method of claim 1 further comprising:

displaying, on a display of the wireless handheld device, an email setting;

enabling, through at least one input device of the wireless handheld device, a change to be made to the displayed email setting; and detecting a change to the displayed email setting.

3. The method of claim 1 where the detected email setting comprises a change to a redirection setting.

4. The method of claim 3 where the redirection setting comprises a setting to indicate, when sent to a network enabled for redirection, that at least some emails potentially receivable on the wireless handheld device are not to be sent to the wireless handheld device from the network.

5. The method of claim 3 where the redirection setting comprises a setting configured to indicate that at least some emails are to be copied into a folder.

6. The method of claim 5 where the redirection setting is configured to indicate, when sent to a network enabled for redirection, that at least some of the emails receivable on the wireless handheld device are to be copied into a folder.

7. The method of claim 1 where the detected email setting comprises a change to an email filter.

8. The method of claim 1 where the detected email setting comprises a change to an auto-signature setting.

9. The method of claim 1 where the detected email setting comprises a change to an out-of-office reply setting.

10. A mobile wireless handheld device comprising:
wireless input and output ports;
a memory;
a display;
at least one input device configured to be usable by a user of the wireless handheld device;
software comprising at least a message application, retrievably stored in the memory; and
a processor operatively coupled to the wireless input and output ports, the memory, the display, the at least one input device, and structured to retrieve and run the software, where the software is further configured to run on the processor, and further where the software and the processor are configured to be able to retrieve and save a plurality of email settings, the email settings further saved in a manner usable by the message application, to enable display of changeable email settings and detection of changes to the email settings by the at least one input device, to save detected changes to email settings in a manner usable by the software, and to send, through the output port, wireless communications configured to be receivable by a wireless server where the detected changes to the email settings are uniquely associable with the wireless handheld device.

11. The mobile wireless handheld device of claim 10 further configured to:
display a changeable email setting;
wait until input is received on said at least one input device;
check if a change to the displayed email setting has been indicated;

save the changed email setting, if a change has been indicated; and
send a message using the wireless output port, said message indicates the changed email setting in a manner which can also uniquely associate the wireless handheld device with the changed email setting.

12. The mobile wireless handheld device of claim 10 where the detected changes to the email settings comprise a change to a redirection setting.

13. The mobile wireless handheld device of claim 12 where the redirection setting comprises a setting to indicate, when sent to a network enabled for redirection, that at least some emails potentially receivable on the wireless handheld device are not to be sent to the wireless handheld device.

14. The mobile wireless handheld device of claim 12 where the redirection setting comprises a setting configured to indicate that at least some emails are to be copied into a folder.

15. The mobile wireless handheld device of claim 14 where the redirection setting is configured to indicate, when sent to a network enabled for redirection, that at least some of the emails receivable on the wireless handheld device are to be copied into a folder.

16. The mobile wireless handheld device of claim 10 where the detected changes to the email settings comprise a change to an email filter.

17. The mobile wireless handheld device of claim 10 where the detected changes to the email settings comprise a change to an auto-signature setting.

18. The mobile wireless handheld device of claim 10 where the detected changes to the email settings comprise a change to an out-of-office reply setting.

19. A method of changing e-mail settings on a wireless network comprising:
providing storage for email settings on the wireless network, the storage enabled for retrievably storing email settings associated with a specific wireless device;
receiving, on the wireless network, a communication comprised of at least one email setting associable with the specific wireless device, where the received at least one email setting has the property of being changeable by an input device on the specific wireless device;
saving, in the storage, the received at least one email setting in a manner associated with the specific wireless device; and
retrieving, at a time later than the time of the saving, the saved at least one email setting and enabling for retrieval any other information in the storage associated with the specific wireless device.

20. The method of claim 19 further comprising:
sending wireless communications receivable by the specific wireless device wherein the wireless communications contain at least one email setting intended to be at least one of saved by the specific wireless device and used by the specific wireless device.

21. The method of claim 19 where the email setting comprises a change to a redirection setting.

22. The method of claim 21 where the redirection setting comprises a setting indicating that at least some emails potentially receivable by the specific wireless device are not to be sent.

23. The method of claim 21 where the redirection setting comprises a setting indicating that at least some emails potentially receivable by the specific wireless device are to be copied into a folder.

24. The method of claim 23 where the redirection setting further comprises a setting indicating that at least some emails potentially receivable by the specific wireless device are to be copied into different folders depending on the contents of one of more of the following fields: to; from; cc; bcc; title.

25. The method of claim 19 where the email setting comprises a change to an email filter.

26. The method of claim 19 where the email setting comprises a change to an auto-signature setting.

27. The method of claim 19 where the email setting comprises a change to an out-of-office reply setting.

* * * * *